United States Patent Office 3,418,276
Patented Dec. 24, 1968

3,418,276
HOMOPOLYMERIC AND COPOLYMERIC ESTERS OF CERTAIN BIS(4-CARBOXYPHENOXYALKYL) CYCLOHEXANES
Emmette F. Izard, Kenmore, N.Y., assignor to E. I. du Pont de Nemours and Company, Wilmington, Del., a corporation of Delaware
No Drawing. Filed Sept. 8, 1964, Ser. No. 395,067
9 Claims. (Cl. 260—47)

ABSTRACT OF THE DISCLOSURE

Linear polymeric polyesters derived from at least one organic diol and an organic dicarboxylic acid which is wholly or in part a bis(4-carboxyphenoxyalkyl)cyclohexane. Fibers of these polyesters exhibit high modulus and high tensile recovery.

---

This invention relates to a novel class of polyesters, and to fibers, films, and other shaped articles produced therefrom.

In accordance with the invention it has been found that certain carboxylated aromatic ethers can be used to prepare a novel class of polyesters having unique physical properties. In particular, several of the polyesters of this novel class show important advantages over polyethylene terephthalate in fiber properties. For example, one polymer melts at 275° C., is crystalline and exhibits tensile recovery and modulus higher than polyethylene terephthalate. In most cases the polymers can be made and spun by the same techniques used for polyethylene terephthalate.

In one embodiment of the invention there is formed a novel polyester of one or more organic diols and one or more polycarboxylic acids, at least a portion of the polycarboxylic acid component, preferably 10 mol percent or more, being of the formula

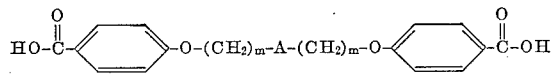

wherein each $m$ is an integer of 1, 2 or 3 and A is a divalent cycloaliphatic radical, e.g. 1,4- or 1,3-cyclohexene radicals. Such a polyester will thus be homopolymeric or copolymeric and will comprise recurring units of the formula

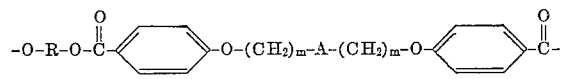

wherein R is a divalent organic radical, e.g., the radical remaining after removal of the hydroxyl groups from an organic diol, and $m$ and A are as above indicated. In fiber form such a linear polyester will preferably have an intrinsic viscosity of at least 0.3, as measured in solution at 25° C. in one part by volume of trifluoroacetic acid and three parts by volume of methylene chloride.

Homopolyesters of the above units, e.g., as consisting essentially of the above units wherein a single dicarboxylic acid is employed and wherein R is the same throughout the polymer molecule, are generally stable to conditions used in commercial melt polymerization and spinning techniques. Polyesters wherein A in the formula is a 1,4-cyclohexene radical are also generally high melting and crystalline. Accordingly, the polyesters are well suited to the formation of fibers, films and other useful shaped articles. Copolyesters are similarly useful and can be formed to offer special advantages.

A convenient method for preparing the polyesters of the invention involves reaction of one or more diols with the dimethyl ester of the above described carboxylated aromatic ethers and, optionally, the dimethyl ester of another dicarboxylic acid in the desired proportion in an ester interchange reaction followed by polycondensation at high temperature and at low partial pressure of the diols, until a polymer of the desired molecular weight is produced. It is advantageous to employ catalysts to accelerate the rate of reaction, and it has been found that manganous acetate, calcium acetate, and sodium methoxide are suitable ester interchange catalysts while antimony trioxide, litharage, and the tetraalkyl titanates such as tetraisopropyl titanates are suitable polycondensation catalysts.

Instead of reacting the diol or diols with dimethyl esters of the acids, other esters of the acids may be used, especially other lower alkyl esters, phenyl esters, or the like. The polyesters may also be prepared by reacting the acid or acids directly with the diol or diols, or with esters of the diols with acetic acid or other lower aliphatic acids. Other equivalent methods may also be employed.

The above described carboxylated aromatic ethers, either alone or along with one or more other dicarboxylic acids, may be reacted with a wide variety of diols of the formula $R(OH)_2$ to form the novel polyesters of the invention. Thus R may be aliphatic, aromatic, or cycloaliphatic and may be either hydrocarbon, as is preferred, or may contain ether, thioether, or other linkages. Typically suitable diols are ethylene glycol, butylene glycol, hexamethylene glycol, 2,2-dimethylpropylene glycol-1,3, decamethylene glycol, polyethylene and polypropylene ether glycols of M.W. 200 to 10,000, trans-1,4-bis(hydroxymethyl)cyclohexane, 3,6-bis($\beta$-hydroxyethyl)durene, decahydro - 2,6 - bis(hydroxymethyl) - naphthalene, trans/trans-1,1'-bicyclohexane-4,4'-dimethanol, bisphenol A (2,2-di(p-hydroxyphenyl)propane), and the like. In conjunction with the carboxylated aromatic ethers, one or more other dicarboxylic acids may suitably be used to form copolyesters. Among various dicarboxylic acids which may be used are adipic acid, sebacic acid, hexahydroterephthalic acid, terephthalic acid, isophthalic acid, 2,6- or 2,7-naphthalic acid, diphenoxyethane-4,4'-dicarboxylate, bis-carboxyphenyl ketone, and p,p'-sulphonyldibenzoic acid. In place of the dicarboxylic acids their corresponding ester-forming derivatives may be used, i.e. derivatives which readily undergo polyesterification with a diol or derivative thereof. For example, a lower alkyl ester of the dicarboxylic acid may be used, such as the dimethyl ester. Alternatively, acid chlorides of the dicarboxylic acids may be used.

The carboxylated aromatic ethers employed in accordance with the invention may be readily prepared by the Williamson ether synthesis using, for example, the sodium salt of p-hydroxybenzoic acid, e.g. the methyl ester thereof, and a dihalide or dimethanesulfonyl ester of 1,4 and 1,3 cyclohexane dialkanols of the formula:

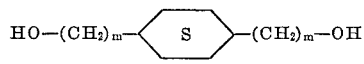

wherein $m$ is methylene, ethylene or propylene and the ring substituents are meta or para. It will be understood that both cis and trans forms of the carboxylated aromatic ethers and their polyesters are contemplated by the invention; variations in melting point can be expected depending upon which form is utilized.

The expression "polymer melt temperature" employed with respect to the products of this invention is the minimum temperature at which a sample of the polymer leaves a wet molten trail as it is stroked with moderate pressure across a smooth surface of a heated metal. "Polymer melt temperature" has sometimes in the past been referred to as "polymer stick temperature."

The term "intrinsic viscosity," as used herein, is defined as the limit of the fraction $$\frac{\ln(r)}{c}$$

as $c$ approaches 0, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C. Intrinsic viscosity is a measure of the degree of polymerization.

In the following examples a number of the polymerizations were performed using as a catalyst a solution of sodium hydrogen hexabutyltitanate, $NaHTi(OBu)_6$. This was prepared by dissolving 1 g. of sodium in 200 ml. of n-butyl alcohol, then adding to this solution 15.0 g. of tetra-n-butyl titanate.

This invention is further illustrated, but is not intended to be limited, by the following examples in which parts and percentages are by weight, unless otherwise specified.

EXAMPLE I

Diesters of the formula:

$$H_3CO-\overset{O}{\underset{\|}{C}}-\phenyl-O-CH_2-A-CH_2-O-\phenyl-\overset{O}{\underset{\|}{C}}-OCH_3$$

wherein A is

—⟨S⟩— (I)

or

⟨S⟩ (II)

(1) Preparation of di-methanesulfonyl esters of 1,4- and 1,3-cyclohexanedimethanol In 200 cc. of pyridine was dissolved 75 g. (0.52 mol.) of the appropriate dihydroxy compound and the mixture cooled. Then 122 g. (1.06 mol.) of methanesulfonyl chloride was added dropwise to the stirred solution in about one hour. After addition, stirring was continued for half an hour at room temperature, then an excess of conc. HCl was added, then cold $H_2O$.

With the 1,4-dimethanol compound, the product precipitated as a solid and was filtered and washed several times with $H_2O$ on the filter. This crude product could be used without purification.

With the 1,3-dimethanol compound, an oil separated on addition of HCl and $H_2O$. This oil was decanted and dissolved in methanol. It solidified on standing, and the solid was recrystallized from methanol M.P. 69–71°. This purified product was used in the preparation of the desired diester.

(2) Preparation of diester

To the sodium salt of methyl p-hydroxybenzoate was added an appropriate amount (0.5 mol per mol of sodium methyl p-hydroxybenzoate) of the desired dimethanesulfonyl ester, as prepared above, and stirring and refluxing is carried out overnight. At the end of this time about 1000 cc. of $H_2O$ was added and the mixture cooled, filtered and the solid material on the filter washed several times with distilled $H_2O$. The crude product was recrystallized from dioxane.

Melting point of (I) is 178–182° C.
Melting point of (II) is 131–136° C.

EXAMPLE II

Homopolyester of ethylene glycol and 1,4-bis(4-carboxyphenoxymethyl)cyclohexane. The polymer has the formula $$-[O-CH_2-CH_2-O-\overset{O}{\underset{\|}{C}}-\phenyl-O-CH_2-\langle S\rangle-CH_2-O-\phenyl-\overset{O}{\underset{\|}{C}}-]_n$$

wherein $n$ is an integer indicative of the number of repeating units and preferably is sufficiently large to give an intrinsic viscosity of at least 0.3.

Into a polymer tube was loaded 17.0 g. of the dimethyl ester of 1,4-bis(4-carboxyphenoxymethyl)cyclohexane and 10.0 g. of ethylene glycol. The latter contained dissolved catalyst; specifically, in an amount of 0.76 g. $Sb_2O_3$ and 1.26 g. calcium acetate per 1500 ml. ethylene glycol. About ½ cc. $NaHTi(OBu)_6$ solution was added and ester exchange was carried out by heating in a metal bath at 230–235° C. for four hours, the evolved methanol being removed by a nitrogen stream passing through the mixture. After two hours the pressure was gradually lowered to 0.5 mm. Hg and the temperature was raised to 270° C. to effect polymerization. After about two hours at 270° C. the tube was removed from the metal bath, cooled under nitrogen and the polymer removed. The product was a white solid, polymer melt temperature 275° C., intrinsic viscosity of 0.4. Solid phase polymerization by further heating at 240–260° for 3 hours raised the intrinsic viscosity to 0.56. The polymer could be spun into fibers.

EXAMPLE III

Copolyester of ethylene glycol and a mixture of 10 mol percent hexahydroterephthalic acid and 90 mol percent 1,4 - bis(4 - carboxyphenoxymethyl)cyclohexane. The polymer has recurring units of the formulas $$-O-CH_2-CH_2-O-\overset{O}{\underset{\|}{C}}-\langle S\rangle-\overset{O}{\underset{\|}{C}}-$$

and $$-O-CH_2-CH_2-O-\overset{O}{\underset{\|}{C}}-\phenyl-O-CH_2-\langle S\rangle-CH_2-O-\phenyl-\overset{O}{\underset{\|}{C}}-$$

Ester exchange and polymerization is effected in the manner described in Example II using a charge of:

Dimethylester of hexahydroterephthalic acid __g__ 0.825
Dimethylester of 1,4-bis(4-carboxyphenoxymethyl) cyclohexane _____g__ 15
Ethylene glycol containing $Sb_2O_3$ and calcium acetate _____cc__ 10

An initial heating at a temperature of 225–230° C. for 4 hours is followed by further heating under reduced pressure at a temperature of 250° C. for 2–3 hours. Solid state polymerization is then effected for 5 hours at 230–250° C. The polymer so obtained has a polymer melt temperature of 265° C. and an intrinsic viscosity of 0.6. The polymer could be spun into fibers.

EXAMPLE IV

Copolyester of ethylene glycol and a mixture of 20 mol percent isophthalic acid and 80 mol percent 1,4-bis-(4-carboxyphenoxymethyl)cyclohexane. The polymer has recurring units of the formulas $$-O-CH_2CH_2-O-\overset{O}{\underset{\|}{C}}-\phenyl-\overset{O}{\underset{\|}{C}}-$$

and

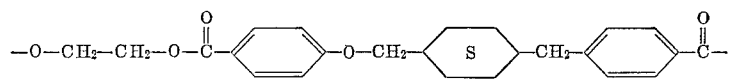

Ester exchange and polymerization is effected in the manner described in Example II using a charge of:

Dimethyl ester of isophthalic acid _____ g__ 1.55
Dimethyl ester of 1,4-bis(4-carboxyphenoxymethyl) cyclohexane _____ g__ 13.4
Ethylene glycol containing $Sb_2O_3$ and calcium acetate _____ cc__ 10

An initial heating of a temperature of 220–230° C. for 3 hours is followed by further heating under reduced pressure at a temperature of 250–260° C. for 4 hours. The polymer so obtained has a polymer melt temperature of 255° C. After solid state polymerization for four hours at 250° C. the intrinsic viscosity is measured and found to be 0.5. The polymer could be spun into fibers.

EXAMPLE V

Homopolyester of 2,2-dimethylpropylene glycol-1,3 and 1,4-bis(4-carboxyphenoxymethyl)cyclohexane. The polymer has the formula

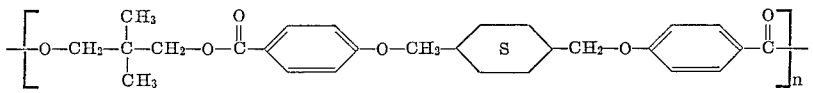

wherein $n$ is an integer indicative of the number of repeating units and is preferably sufficiently large to give an intrinsic viscosity of at least 0.3.

Ester exchange and polymerization is effected in the manner described in Example II using a charge of:

2,2-dimethylpropylene glycol-1,3 _____ g__ 5.7
Dimethyl ester of 1,4-bis(4-carboxyphenoxymethyl) cyclohexane _____ g__ 10
Tetrabutyl titanate as a catalyst _____ drops__ 6

An initial heating at a temperature of 220–230° C. for 3 hours is followed by further heating under reduced pressure at a temperature of 250–260° C. for 4½ hours and then 270° C. for ½ hour. Fibers could be pulled from the melt. The polymer so obtained has a polymer melt temperature of 170° C. and an intrinsic viscosity of 0.53.

EXAMPLE VI

Homopolyester of decahydro-2,6-bis(hydroxymethyl) naphthalene 1,4 - bis(4 - carboxyphenoxymethyl)cyclohexane. The polymer has the formula

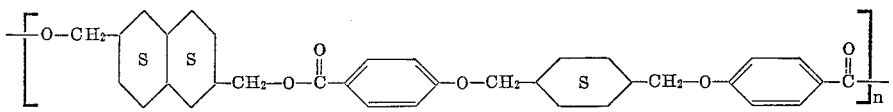

wherein $n$ is an integer indicative of the number of repeating units and is preferably sufficiently large to give an intrinsic viscosity of at least 0.3.

Ester exchange and polymerization is effected in the manner described in Example II using a charge of:

Decahydro-2,6-bis(hydroxymethyl)naphthalene (the preparation of which is described in U.S. application S.N. 170,523 filed Feb. 1, 1962) _____ g__ 8.15
Dimethyl ester of 1,4-bis(4-carboxyphenoxymethyl) cyclohexane _____ g__ 10
$NaHTi(OBu)_6$ solution _____ drops__ 5

An initial heating at a temperature of 230° C. for 2 hours is followed by further heating under reduced pressure at a temeprature of 250–270° C. for 4 hours. The polymer so obtained has a polymer melt temperature of 268° C. and an intrinsic viscosity of 0.4. The polymer could be spun into fibers.

EXAMPLE VII

Homoplyester of ethylene glycol and 1,3-bis(4-carboxyphenoxymethyl)cyclohexane. The polymer has the formula

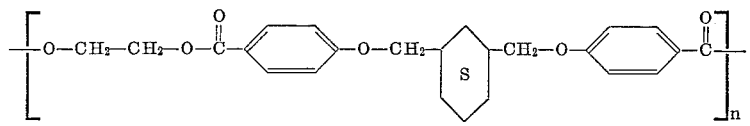

wherein $n$ is an integer indicative of the number of repeating units and is preferably sufficiently large to give an intrinsic viscosity of at least 0.3.

Ester change and polymerization is effected in the manner described in Example II using a charge of:

Dimethyl ester of 1,3-bis(4-carboxyphenoxymethyl) cyclohexane _____ g__ 12.0
Ethylene glycol _____ cc__ 6.0
$NaHTi(OBu)_6$ solution _____ drops__ 4

An initial heating at a temperature of 230° C. for 3 hours is followed by further heating under reduced pressure at a temperature of 250° C. for 4 hours. The polymer so obtained has a polymer melt temperature of 95° C. and an intrinsic viscosity of 0.4. The polymer could be spun into fibers.

EXAMPLE VIII

Copolyester of ethylene glycol and a mixture of 75 mol percent p,p'-bibenzoic acid and 25 mol percent 1,3-bis(4-carboxyphenoxymethyl)cyclohexane. The polymer has recurring units of the formula

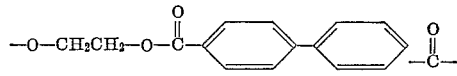

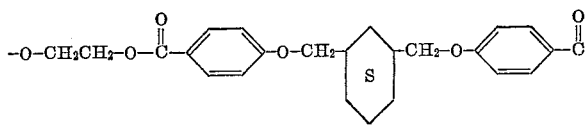

Ester exchange and polymerization is effected in the manner described in Example II using a charge of:

| | |
|---|---|
| Dimethyl ester of p,p'-bibenzoic acid _____g____ | 10 |
| Dimethyl ester of 1,3-bis(4-carboxyphenoxymethyl) cyclohexane _____g____ | 5.08 |
| Ethylene glycol _____g____ | 10 |
| NaHTi(OBu)$_6$ solution _____drops__ | 4 |

The polymer so obtained has a polymer melt temperature of 115° C. and an intrinsic viscosity of 0.63. The polymer could be spun into fibers.

EXAMPLE IX

Homopolyester of ethylene glycol and 1,4-bis(4-carboxyphenoxymethyl)cyclohexane. The polymer has the formula

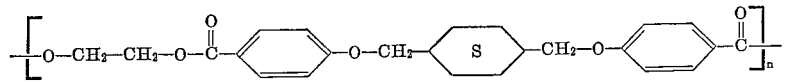

wherein $n$ is an integer indicative of the number of repeating units and preferably is sufficiently large to give an intrinsic viscosity of at least 0.3.

Into a standard polymer tube was introduced 15 g. of the dimethylester of 1,4-bis(4-carboxyphenoxymethyl) cyclohexane, 15 g. ethylene glycol and 0.0045 gram PbO. The mixture was heated at a temperature of 197° C. for 20 hours to effect ester-exchange. At the end of that period the tube was heated to 260° C. to remove excess glycol and thereafter vacuum was applied to the contents of the tube and it was further heated at 260° C. for a period of 4 hours. Then 10 cc. ethylene glycol and a small additional amount of PbO were introduced and the contents heated for one more hour at atmospheric temperature. Vacuum was again applied and the tube heated at 285° C. for 2 hours. The polymer so obtained had a polymer melt temperature of 270° C. and an intrinsic viscosity of 0.65. In this case the intrinsic viscosity was measured in a solvent composed of a 60/40 volume mixture of phenol and tetrachlorethane.

EXAMPLE X

Fibers were melt spun from polymers of the invention, drawn in length over a heated metal surface, subjected to a finishing operation and various properties measured thereon. A control sample, similarly prepared, was a homopolymer of ethylene glycol and terephthalic acid. Data obtained from fibers of the invention versus those of the control are as follows:

TABLE I

| | Control | Example II Polyester | Example III Polyester |
|---|---|---|---|
| Polymer melt temperature,° C | 245 | 275 | 265 |
| Intrinsic Viscosity (polymer) | 0.7 | 0.56 | 0.6 |
| Spinning Temp.,° C | 295 | 320 | 320 |
| Draw Ratio | 4× | 3× | 4.2× |
| Draw (Heated Metal Surface) Temp.,° C | 93 | 160 | 160-175 |
| T/E/Mi | 4/19/83 | 2/7/103 | 2.6/4.3/118 |
| Caustic Sensitivity (Relative to polyethylene terephthalate) | 1 | 0.5 | (¹) |
| TSR | 63 | 69 | 63 |

¹ Approximately 0.5.

The finished fibers of Examples II and III of the invention exhibit a comparable or reduced caustic sensitivity as compared to polyethylene terephthalate fibers. They are also equal or superior to polyethylene terephthalate in TSR or "tensile strain recovery"; that is, the higher the recovery the greater is the resistance to wrinkling. Considering additionally the resistance of these novel fibers to methylene chloride, perchlorethylene, and trichlorethylene, it is apparent they are well suited to garment fabrics, especially wash-wear fabrics. Although the dyeability of drawn fibers was not measured, the undrawn fibers of Examples II and III were found to accept at least twice as much of a violet disperse dye as would the undrawn polyethylene control. The substantially higher modulus values also means that the novel fibers are advantageous for use in V-belt reinforcement, fire hose, cordage, sewing thread, sail-cloth, etc.

In this example, values of tenacity in g.p.d., elongation in percent, and initial modulus in g.p.d. (all expressed as "T/E/Mi") as well as the disperse dye test, "caustic sensitivity" and "TSR" are determined upon polyester fibers which have been spun, drawn and subjected to a finishing procedure which comprises the consecutive steps of:

(a) Heat treating the filaments by boiling them in water for 15 minutes while allowing 3% shrinkage in length, (b) Heating the filaments in an oven at 180° C. for 3 minutes, again allowing 3% shrinkage in length, (c) Heat treating the filaments by boiling them in water for 15 minutes while allowing 1% shrinkage in length, and finally (d) Air drying the filaments.

The test for alkaline sensitivity is carried out by boiling one part of the test fibers in 1,000 parts of a 1% aqueous solution of sodium hydroxide for 3 hours. The results given in Table I are based on assigning an arbitrary value of unity to the fractional weight lost by the polyethylene terephthalate fibers. As indicated in the table, those of the invention have a level of alkaline sensitivity comparable or superior to that of polyethylene terephthalate.

The TSR of a yarn sample is determined by mounting a 10-inch length of the yarn on a tensile tester with recording chart (commercially available from the Instron Engineering Corporation, Quincy, Mass.) and also equipped with a circulating water bath which can be raised and lowered. The water bath, maintained at 40° C., is raised to immerse the yarn. After the yarn has been immersed for 2 minutes without tension it is stretched, in the water bath, at an elongation rate of 1 inch per minute. Upon reaching the desired total elongation, the sample is held at constant length for an additional 2 minutes and the water bath is removed. The load on the yarn is then reduced to a value of 0.042 g.p.d. and the yarn is allowed to retract. Percent recovery is calculated from the formula:

$$\frac{\text{units of retraction}}{\text{units of elongation}} \times 100$$

This procedure is carried out for elongations of 0.5, 1, 2, and 3%, and a graph is prepared by plotting the percent recovery against total elongation in the range 0–3%. TSR values are average percent recovery values from the range 0–3% elongation which may be determined from the graph by usual graphical averaging procedures.

As many widely different embodiments of this invention may be made without departing from the spirit and scope thereof, it is to be understood that this invention is not to be limited to the specific embodiments thereof except as defined in the appended claims.

What is claimed is:

1. A linear fiber-forming polymeric polyester of a mixture consisting essentially of at least one organic diol and at least one polycarboxylic acid; at least 10 mol percent of the polycarboxylic acid component is an acid of the formula

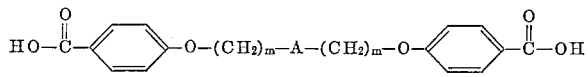

wherein each $m$ is an integer of 1 to 3 and A is 1,4-cyclohexylene or 1,3-cyclohexylene; the remainder of the polycarboxylic acid component is at least one member of the group consisting of adipic acid, sebacic acid, hexahydroterephthalic acid, terephthalic acid, isophthalic acid, p,p'-bibenzoic acid, 2,6-naphthalic acid, 2,7-naphthalic acid, diphenoxyethane-4,4'-dicarboxylate, bis-carboxyphenyl ketone, p,p'-sulphonyldibenzoic acid; the diol component is at least one member of the group consisting of ethylene glycol, butylene glycol, hexamethylene glycol, 2,2-dimethylpropylene glycol-1,3, decamethylene glycol, polyethylene ether glycol of molecular weight 200 to 10,000, polypropylene ether glycol of molecular weight 200 to 10,000, trans-1,4-bis(hydroxymethyl)cyclohexane, 3,6-bis($\beta$-hydroxyethyl)durene, decahydro-2,6-bis(hydroxymethyl)-naphthalene, trans/trans-1,1'-bicyclohexane-4,4'-dimethanol, and 2,2-di(p-hydroxyphenyl)propane.

2. A polymeric polyester of claim 1 wherein the diol component is ethylene glycol and the acid component is 1,4-bis(4-carboxyphenoxymethyl)cyclohexane.

3. A polymeric polyester of claim 1 wherein the diol component is ethylene glycol, about 90 mol percent of the acid component is 1,4-bis(4-carboxyphenoxymethyl)cyclohexane, and about 10 mol percent of the acid component is hexahydroterephthalic acid.

4. A polymeric polyester of claim 1 wherein the diol component is ethylene glycol, about 80 mol percent of the acid component is 1,4-bis(4-carboxyphenoxymethyl)cyclohexane, and about 20 mol percent of the acid component is isophthalic acid.

5. A polymeric polyester of claim 1 wherein the diol component is 2,2-dimethylpropylene glycol-1,3 and the acid component is 1,4-bis(4-carboxyphenoxymethyl)cyclohexane.

6. A polymeric polyester of claim 1 wherein the diol component is 2,6-decahydro-2,6-bis(hydroxymethyl)naphthalene and the acid component is 1,4-bis(4-carboxyphenoxymethyl)cyclohexane.

7. A polymeric polyester of claim 1 wherein the diol component is ethylene glycol and the acid component is 1,3-bis(4-carboxyphenoxymethyl)cyclohexane.

8. A polymeric polyester of claim 1 wherein the diol component is ethylene glycol, about 25 mol percent of the acid component is 1,3-bis(4-carboxyphenoxymethyl)cyclohexane, and about 75 mol percent of the acid component is p,p'-bibenzoic acid.

9. Fibers of a polymeric polyester of claim 1 having an intrinsic viscosity of at least 0.3, as measured in solution at 25° C. in one part by volume of trifluoroacetic acid and 3 parts by volume of methylene chloride.

References Cited

UNITED STATES PATENTS 2,503,251  4/1950  Edwards et al. _____ 260—47
3,033,822  5/1962  Kibler et al.

WILLIAM H. SHORT, Primary Examiner.

LOUISE P. QUAST, Assistant Examiner.

U.S. Cl. X.R.

260—473, 456, 75, 33.4, 338; 264—176